Aug. 26, 1947.  C. H. CHAMBERS  2,426,178
INTELLIGENCE REPRODUCING SYSTEM
Filed Sept. 16, 1944
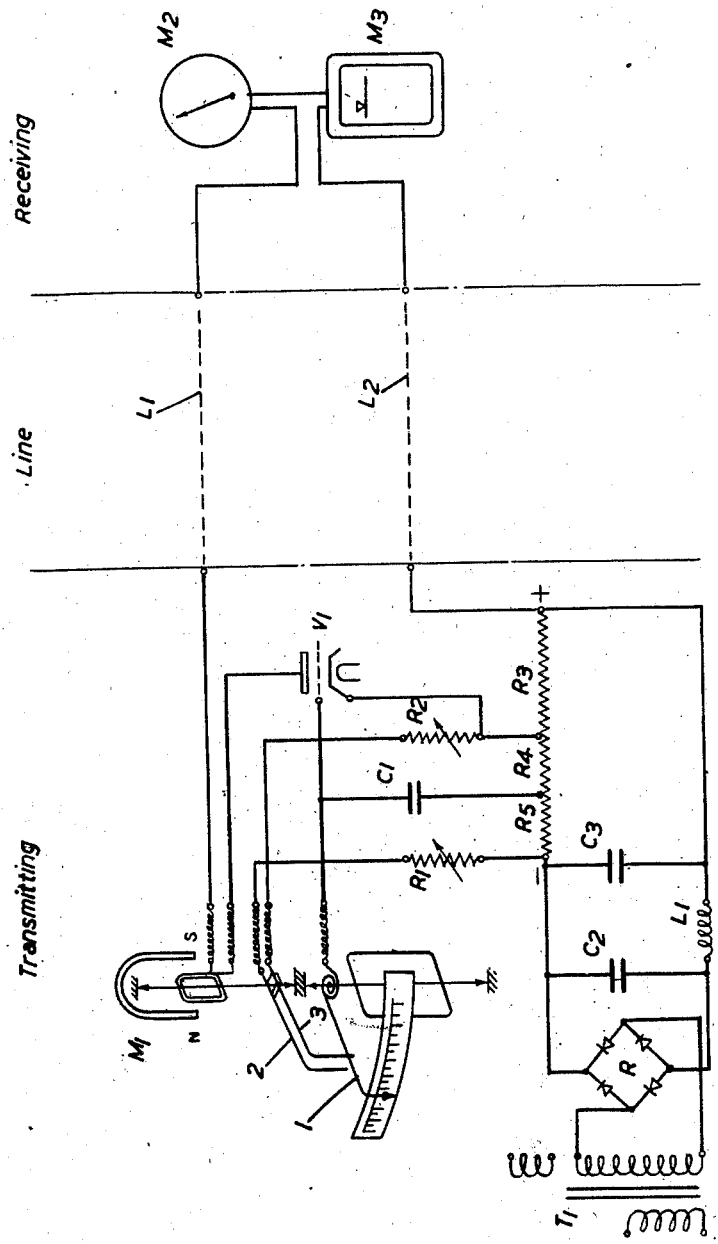
Inventor
Cyril Herbert Chambers
By
Attorney Patented Aug. 26, 1947

2,426,178

UNITED STATES PATENT OFFICE 2,426,178

INTELLIGENCE REPRODUCING SYSTEM

Cyril Herbert Chambers, London, England, assignor to Standard Telephones and Cables Limited, London, England, a British company Application September 16, 1944, Serial No. 554,366
In Great Britain September 28, 1943

2 Claims. (Cl. 177—351)

This invention relates to reproducing systems and is more particularly concerned with arrangements for repeating indications, such as meter readings, at a distance.

Arrangements for repeating at a distance the position of a pointer have previously been proposed in which follow up contacts co-operate with the pointer to connect the armature of an electric motor into circuit to cause the motor to vary a resistance in series with a current measuring instrument controlling the follow up contacts in such direction that the contacts followed the position of the pointer, the said resistance also serving to vary the current transmitted over a line to a distant current measuring instrument.

It is the object of the present invention to provide an arrangement for repeating at a distance the position of a pointer which will give an indication that is independent of the length or other constants of the line connected to the distant instrument and also independent of variations in the voltage of the source of electrical energy used in such arrangement.

According to one feature of the invention we provide an arrangement for repeating at a distance the position of a pointer comprising electrically responsive indicators connected in series in the anode circuit of a thermionic valve with a source of electrical energy, one of said indicators being associated with the device the movements of which are to be indicated at a distance by contacting means moving therewith which control the potential upon the grid of said valve.

According to another feature of the invention we provide an arrangement for repeating at a distance the position of a pointer comprising a follow up device adapted to be moved by a current measuring instrument in series in the anode circuit of a thermionic valve with a distant current measuring instrument and means controlled by the relative movement of the pointer and the follow up device for varying the potential applied to the grid of said valve in a direction to cause the follow up device to follow the movement of the said pointer.

According to still another feature of the invention we provide an arrangement for repeating at a distance the position of a pointer comprising a follow up device, a current measuring instrument connected in the anode circuit of a thermionic valve for moving the follow up device, means controlled by the relative movement of the pointer and the follow up device for varying the potential applied to the grid of said valve in a direction to cause the follow up device to follow the movement of said pointer, the anode circuit of said valve also including a two wire line and means at the distant end of said line therein for giving an indication of the flow of current therein.

In the preferred embodiment of the invention the follow up device comprises a fork member which straddles the pointer the position of which is to be indicated in such a manner that the pointer on moving in one or the other direction makes contact with the fork member and thus completes a charging circuit for a condenser connected between the grid and cathode of the thermionic valve. The charging current flows in such direction as to cause the charge on the condenser and thus the potential applied to the grid of the valve to increase or decrease the current in the anode circuit and thus to cause the current measuring instrument to move the fork member in the same direction as the pointer and eventually when this fork member again straddles the pointer contact is broken and the charging circuit is interrupted. It is clear, however, that there need not be an actual making of contact between the pointer and the follow up device, as other means of determining direction of movement, and coincidence of position may be used, such for example as an optical method using light sensitive devices.

The nature of the invention will be better understood from the following description of one embodiment thereof taken in conjunction with the accompanying drawing.

Referring to the drawing, the pointer 1, the position of which is to be indicated at a distance, may be the pointer of any kind of instrument such as a voltmeter, ammeter, wattmeter, gas pressure meter or the like or may indicate water level or other quantity. The pointer 1 is shown as moving in a circular arc and is straddled by a fork member 2, 3 carried on the shaft of a moving coil D. C. milliammeter $M_1$ which shaft is mounted concentrically and axially with that of pointer 1. The coil of the milliammeter $M_1$ is connected in the anode circuit of a thermionic valve $V_1$ in series with a two wire line $L_1L_2$ and a similar milliammeter $M_2$ at the distant station. A recording milliammeter $M_3$ at the distant station may be included in the series circuit. The pointer 1 is connected to the grid of the valve $V_1$, and a condenser $C_1$ of large capacity, e. g. 2 mf. is connected between the grid of the valve $V_1$ and the junction point of resistances $R_4$ and $R_5$ connected between the negative terminal of the source of supply voltage for the valve $V_1$ and the cathode. Resistances $R_4$ and $R_5$ provide a grid potential which biasses the valve to cut off. The arms 2, 3 of the fork member straddling the pointer 1 are connected to the ends of adjustable resistances $R_1$ and $R_2$ respectively, the other ends of which are connected as shown to opposite ends of the resistances $R_5$ and $R_4$. A resistance $R_3$ is connected in the anode circuit of valve $V_1$. Potential is supplied to the valve from an A. C. source through a transformer $T_1$, a rectifier bridge R, and a smoothing circuit $L_1C_2C_3$.

The operation of the arrangement is as follows: Assume that the scale deflection of the pointer 1 increases so that the pointer makes contact with the arm 3 of the fork. Charging current will then flow through resistance $R_2$ to charge condenser $C_1$ and make the plate thereof connected to the grid of valve $V_1$ more positive. This causes an increase in the current in the anode circuit of valve $V_1$ and thus the meter $M_1$ moves until the contact arm 3 separates from the pointer 1. Condenser $C_1$ is then left charged to a particular potential which maintains a constant anode current. This current is proportional to the angular deflection of pointer 1 and the milliammeter $M_2$ will give the same reading as milliammeter $M_1$. The resistance of the line $L_1L_2$ will not introduce any error into the readings.

If now pointer 1 moves to decrease the scale reading it makes contact with the member 2 of the fork and current will flow through resistance $R_1$ tending to charge condenser $C_1$ in the opposite direction and thus reducing the potential on the grid of valve $V_1$ and the current in the milliammeters $M_1$ and $M_2$ until the contacts again separate.

The time of response will depend upon the time constant of condenser $C_1$ and resistance $R_1$ or $R_2$. It is preferred that the time constant should be greater than the natural periodicity of pointer 1. Suitable values for resistances $R_1$ and $R_2$ are from one quarter to one half a megohm.

It is clear that the arrangement is not limited to the use of a single valve, two or more valves could be used in parallel or in series depending upon the magnitude of the line current desired and upon the kind of valve used.

What is claimed is:

1. An arrangement for repeating at a distance the position of a pointer, comprising a follow-up device adapted to be moved by a measuring instrument, a thermionic valve having an anode, a cathode, and a grid, an anode circuit connected to said anode, a cathode circuit connected to said cathode, and a grid circuit connected to said grid, said instrument being connected in series in said anode circuit with one or more distant measuring instruments, a condenser connected between said grid and a point on said cathode circuit having a negative voltage with respect to said cathode, circuits operatively connected to said follow-up device for charging said condenser in opposite directions completed by relative movement in respectively opposite directions between said pointer and said follow-up device, and a means for breaking said charging circuits upon said follow-up device attaining a position corresponding to that of said pointer.

2. An arrangement for repeating at a distance the position of a pointer, comprising, a follow-up device adapted to be moved by a measuring instrument, a thermionic valve having an anode, a cathode, and a grid, an anode circuit, a cathode circuit, and a grid circuit, a voltage divider resistance connected to said anode circuit, said cathode circuit, and said grid circuit and a source of voltage in such a manner that said instrument is connected in series in said anode circuit with one or more distant measuring instruments and a point of high voltage on said voltage divider resistance, said cathode is connected to a point of lower voltage on said voltage divider resistance than the anode circuit, a condenser connected between said grid and a point on said voltage dividing resistance of lower voltage than said cathode, circuits operatively connected to said follow-up device for charging said condenser in opposite directions, completed by relative movement in respectively opposite directions between said pointer and said follow-up device, two resistances operatively connected to said pointer when said follow-up device moves a predetermined distance with respect to said pointer and connected to points of different voltage on said voltage divider resistance, said charging of said condenser being accomplished through said resistances, and means for breaking said charging circuits upon said follow-up device attaining a position corresponding to said pointer.

CYRIL HERBERT CHAMBERS.

REFERENCES CITED

The following references are of record in the file of this patent:

UNITED STATES PATENTS

| Number | Name | Date |
|---|---|---|
| 1,948,092 | Angus | Feb. 20, 1934 |
| 1,986,613 | Warren | Jan. 1, 1935 |
| 1,916,737 | Midworth | July 4, 1933 |
| 1,957,240 | Young | May 1, 1934 |
| 2,077,086 | Adair | Apr. 3, 1937 |

FOREIGN PATENTS

| Number | Country | Date |
|---|---|---|
| 125,537 | Austria | Mar. 25, 1932 |